United States Patent
Hu

(10) Patent No.: US 7,304,738 B2
(45) Date of Patent: *Dec. 4, 2007

(54) METHOD FOR ACTIVELY ALIGNING AN OPTOELECTRONIC DEVICE

(75) Inventor: Charles Hu, San Francisco, CA (US)

(73) Assignee: Finisar Corporation, Sunnyvale, CA (US)

( * ) Notice: Subject to any disclaimer, the term of this patent is extended or adjusted under 35 U.S.C. 154(b) by 422 days.

This patent is subject to a terminal disclaimer.

(21) Appl. No.: 10/924,691

(22) Filed: Aug. 24, 2004

(65) Prior Publication Data

US 2005/0046844 A1    Mar. 3, 2005

Related U.S. Application Data

(60) Provisional application No. 60/498,151, filed on Aug. 27, 2003, provisional application No. 60/498,272, filed on Aug. 27, 2003.

(51) Int. Cl.
*G01B 11/00* (2006.01)
(52) U.S. Cl. .................. 356/399; 385/92; 385/93; 356/400
(58) Field of Classification Search ............. 356/399, 356/400, 139.4–139.06; 385/31–37, 88–93, 385/52
See application file for complete search history.

(56) References Cited

U.S. PATENT DOCUMENTS

| | | | |
|---|---|---|---|
| 3,987,676 A | 10/1976 | Bennewitz | |
| 4,128,697 A | 12/1978 | Simpson | |
| 4,375,578 A | 3/1983 | Mitchell et al. | |
| 4,749,250 A * | 6/1988 | Carter | 385/52 |
| 4,769,684 A | 9/1988 | Crocker et al. | |
| 4,818,099 A | 4/1989 | Preikschat et al. | |
| 4,984,885 A * | 1/1991 | Ortiz, Jr. | 356/153 |
| 5,212,345 A | 5/1993 | Gutierrez | |
| 5,245,682 A * | 9/1993 | Ortiz, Jr. | 385/33 |
| 5,383,118 A * | 1/1995 | Nguyen | 700/59 |
| 5,545,846 A | 8/1996 | Williams et al. | |
| 6,205,266 B1 * | 3/2001 | Palen et al. | 385/15 |
| 6,302,596 B1 * | 10/2001 | Cohen et al. | 385/93 |
| 6,521,989 B2 | 2/2003 | Zhou | |
| 6,586,678 B1 | 7/2003 | Rosenberg et al. | |
| 6,678,047 B1 * | 1/2004 | Miyazaki et al. | 356/399 |
| 6,703,561 B1 | 3/2004 | Rosenberg et al. | |
| 6,851,870 B1 * | 2/2005 | Deng et al. | 385/93 |
| 2003/0197254 A1 | 10/2003 | Huang | |
| 2004/0197254 A1 | 5/2004 | Farr | |
| 2005/0046974 A1 | 8/2004 | Hu | |

OTHER PUBLICATIONS

Murata, S., Nishimura, K., *Improvement in Thermal Properties of a Multi-Beam Laser Diode Array*, Japanese Journal of Applied Physics, vol. 28, Suppl. 28-3, pp. 165-170 (1989).

* cited by examiner

*Primary Examiner*—Layla G. Lauchman
(74) *Attorney, Agent, or Firm*—Workman Nydegger

(57) ABSTRACT

A method for actively aligning the components of an optoelectronic device. The optoelectronic device includes a first portion containing a laser and a second portion containing an optical element. In one embodiment, the optoelectronic device is a laser package having a header structure containing a laser and a header can containing a lens. The method includes transmitting an optical signal from the laser through the optical element and comparing the position of the optical signal relative to a reference in order to determine whether the optical coupling of the laser with the optical element is within a desired tolerance range.

10 Claims, 3 Drawing Sheets

METHOD FOR ACTIVELY ALIGNING AN OPTOELECTRONIC DEVICE

This application claims the benefit of U.S. Provisional Patent Application Ser. No. 60/498,151, filed Aug. 27, 2003, and entitled "Method for Optically Aligning Laser Assembly With Housing," and also claims the benefit of U.S. Provisional Patent Application Ser. No. 60/498,272, filed Aug. 27, 2003 and entitled, "Fabrication and Optical Alignment Device," which applications are hereby incorporated by reference in their entireties.

BACKGROUND OF THE INVENTION

1. The Field of the Invention

The present invention relates generally to methods for aligning the components of an optoelectronic device, such as a laser package for use in an optical transmitter or transceiver.

2. Related Technology

Optoelectronic devices are commonly packaged as part of an assembly of mechanical, electrical, and optical components designed to couple light into other optical elements. As one example, an individual optoelectronic device may be packaged to couple light into a single optical fiber. As another example, optoelectronic devices may comprise an array of receivers or transmitters that is packaged as part of a connector assembly for coupling light into an array of optical fibers.

Optoelectronic devices that are optically coupled to other devices or waveguides typically need to be suitably aligned so as to effectively pass an optical signal between the various devices. However, as the alignment requirements of optoelectronic devices become more stringent, existing alignment techniques sometimes result in variances greater than the allowed tolerance, resulting in waste and low yields.

BRIEF SUMMARY OF AN EXEMPLARY EMBODIMENT OF THE INVENTION

Exemplary embodiments of the invention are directed to an optically aligned optoelectronic device and an improved method to package such optoelectronic device with a high degree of alignment accuracy so as to enable effective and efficient transmission of optical signals within optoelectronic devices, and between the optoelectronic devices and other devices.

The methods of the present invention apply to actively aligning an optoelectronic device such as a laser package during assembly of the laser package. In addition, the present invention applies to actively aligning other optical elements with an optoelectronic device. For example, an assembled laser package can be actively aligned with another optical element such as, but not limited to, an optical fiber, a lens, an isolator, a collimator, a filter, a circulator, and the like.

An exemplary laser package can include a header structure, an optical transmitter such as a laser, an active temperature controller, a lens, and a header can. In one exemplary embodiment, the housing of the laser package includes a header structure and a header can. The various other parts of the laser package are attached so as to be situated within the housing. For example, the laser may be mounted to an active temperature controller which is, in turn, attached to the header structure, while the lens is mounted inside the header can. Exemplarily, the invention provides a method for actively aligning the header structure, which carries the laser and the temperature controller, with the header can that carries the lens.

In one exemplary embodiment of the alignment method, power is provided to the laser, causing the laser to generate an optical signal which is then directed through the lens. As the optical signal passes through the lens, a camera with a zoom lens receives an image of the resulting signal which is compared to a tolerance range to determine if the positioning of the laser relative to the lens is within a desired tolerance. The position of the header structure and header can are then adjusted relative to one another so as to cause their alignment to be within a desired tolerance range, at which point the header structure and header can be joined together by a suitable process such as resistance projection welding, for example.

Thus, one method of the present invention includes securely positioning a first portion containing a laser and a second portion containing an optical element such that the laser can be optically coupled with the optical element and such that at least one of the first portion and the second portion can be moved in at least one dimension; transmitting an optical signal from the laser through the optical element; determining a position of the optical signal relative to a reference, the reference defining a desired tolerance; and adjusting the position of at least one of the first portion and the second portion until the optical signal is within the desired tolerance.

The ability to accurately align the optoelectronic devices enables the manufacture of transmitters or transceivers capable of allowing optical signals generated by the laser to be effectively and reliably transmitted through the lens and into an attached optical fiber or other optical element or optoelectronic device.

BRIEF DESCRIPTION OF THE DRAWINGS

In order that the manner in which the above recited and other benefits, advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF AN EXEMPLARY EMBODIMENT

I. Introduction

Exemplary embodiments of the invention are directed to an optically aligned optoelectronic device and an improved method to package such optoelectronic device with a high degree of alignment accuracy so as to enable effective and efficient transmission of optical signals within optoelectronic devices, and between the optoelectronic devices and other devices. Optoelectronic devices are commonly packaged as part of an assembly of mechanical, electrical, and optical components designed to couple light into other optical elements.

A detailed description of an exemplary embodiment of the invention will now be provided with specific reference to figures illustrating various stages and other aspects of the method of the present invention. It will be appreciated that like structures will be provided with like reference designations.

II. An Exemplary Optoelectronic Device

For purposes of describing the invention, an optoelectronic laser package will be described. However, it will be appreciated that the laser package is only provided by way of illustration and not by limitation and that the methods of the present invention can also apply to actively aligning an optoelectronic device with another optical element for example, but not limited to, an optical fiber, an isolator, a collimator, a filter, or a circulator, and the like.

Figure 2:
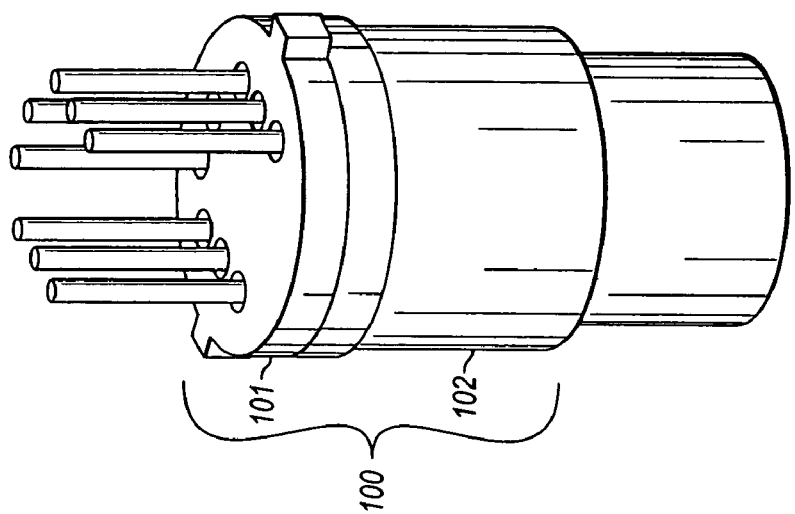
FIG. 2 is a perspective view of the laser package subassembly of FIG. 1, as aligned and assembled in accordance with the method of the present invention.
Figure 1:
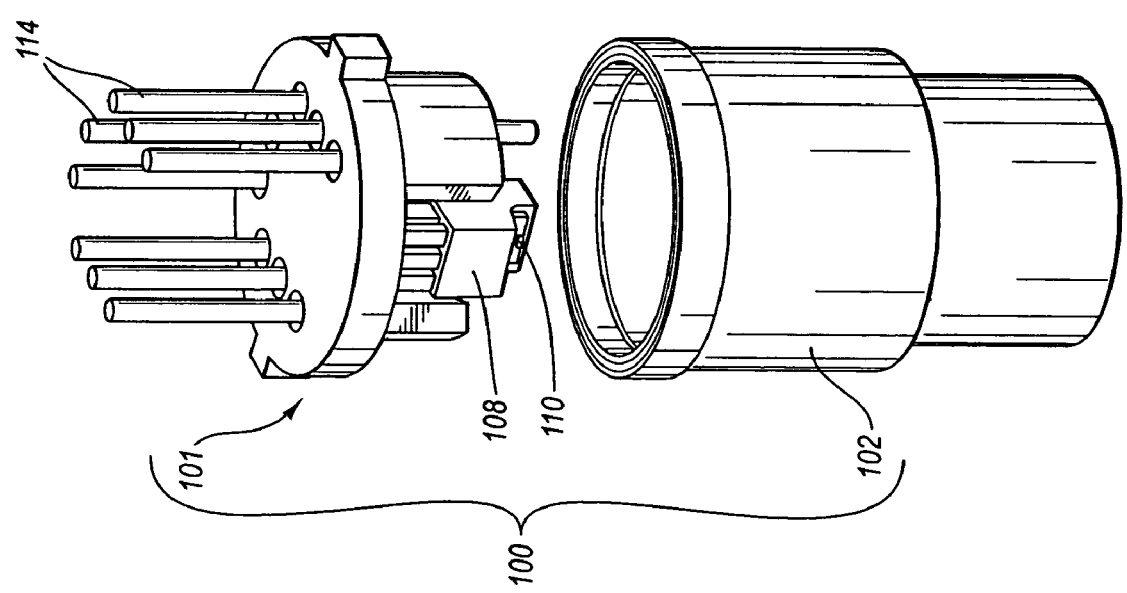
FIG. 1 is a perspective view of a laser package subassembly prior to attachment of the header structure to the header can by an exemplary embodiment of the method of the present invention.
Figure 3:
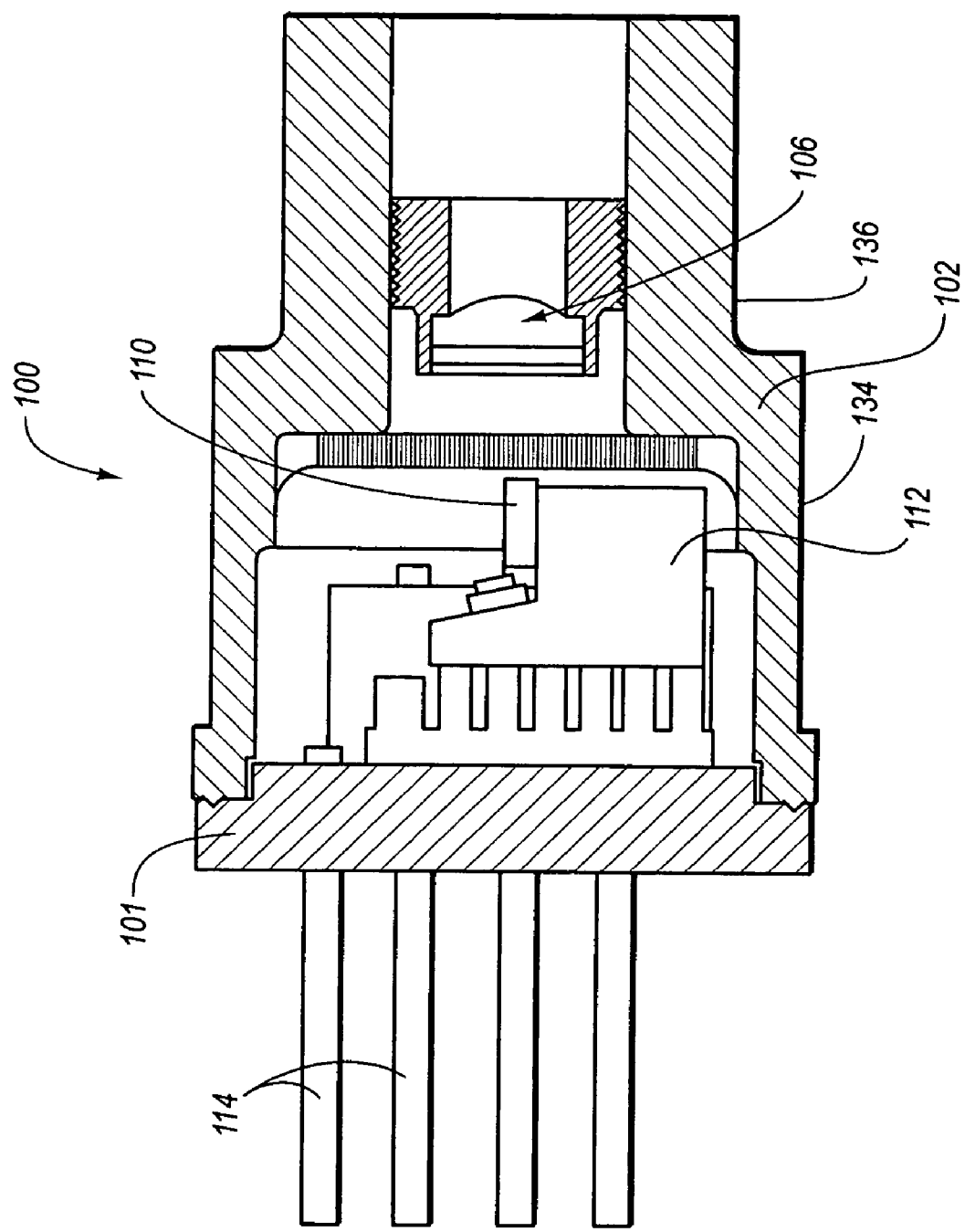
FIG. 3 is a cross sectional view of the laser package subassembly of FIG. 2.

FIG. 1 illustrates an exemplary laser package 100 having a header structure 101 and a header can 102. FIG. 1 is a perspective view of the laser package 100 prior to attachment of the header structure 101 to the header can 102. FIG. 2 illustrates the same laser package 100 but in an assembled configuration, while FIG. 3 illustrates a cross section of the assembled configuration of FIG. 2. It should be noted here that the Figures simply illustrate one example of an optoelectronic device that may be produced using the alignment and assembly methods disclosed herein. Such methods may, more generally, be employed in connection with the assembly of any of a variety of other optoelectronic devices as well and the scope of the invention should, accordingly, not be construed to be limited to the use of such methods in connection with any particular optoelectronic device.

As indicated in the Figures, laser package 100 includes a header structure 101 configured to mate with header can 102. When assembled, the header structure 101 and the header can 102 together form the housing of laser package 100. The header can 102 includes a lens 106 (FIG. 3). Exemplarily, the lens 106 is situated approximately at the center of the header can 102 so as to be positioned to pass optical signals emitted by the laser 110 (FIG. 3).

When assembled, the envelope of the laser package 100 is comparable in size and configuration to that of a transistor outline ("TO") package. Thus, laser packages assembled in accordance with the method disclosed herein can be fitted within optoelectronic transceiver or transmitter modules that are constructed according to standardized form factor requirements, for example, GigaBit Interface Converter ("GBIC"), and Small Form Factor Pluggable ("SFP"). It will be appreciated that the laser package 100 and/or associated alignment method are adaptable to various existing or yet to be determined transceiver or transmitter module form factors, and various other optical components as well.

As shown in FIGS. 1 through 3, the exemplary header structure 101 further includes an active temperature control device 108. A laser 110, exemplarily implemented as a laser diode, is mounted to the active temperature control device 108 via a laser submount 112, as best illustrated in FIG. 3. The laser submount 112 may be made of aluminum nitride, silicon, or other suitable materials, and the laser submount 112 may incorporate one or more integrated passive components, such as resistors, capacitors, and inductors, for example, to provide improved impedance matching and signal conditioning. The header structure 101 also includes multiple leads 114 for connecting components inside the laser package 100 to the exterior of the laser package 100.

Generally, the laser 110 is positioned and aligned with the lens 106 such that optical signals generated by the laser 110 are aimed at and transmitted through the lens 106. The lens 106 is configured to provide a collimating and focusing effect on the optical signal generated by the laser 110. Alignment of the lens 106 to the laser 110 is important because precise alignment results in improved capture of the optical signal generated by the laser 110. The combination of precise alignment and collimating effect of the lens 106 aids the optical signal in being properly introduced into an optical fiber, or other optical element or optoelectronic device, arranged in optical communication with the laser package 100.

Exemplarily, the lens 106 is configured to provide a collimating or focusing effect on the optical signal generated by the laser 110. In some cases, the laser package 100 includes a glass window in place of the lens 106. Lens 106 is one example of an optical element that can be used in an optoelectronic device of the present invention. Other optical elements include, but are not limited to, an optical fiber, a window, an isolator, a collimator, a filter, a circulator, and the like.

In one exemplary embodiment, the header structure 101 is made by metal injection molding ("MIM"). The material used for making the header structure 101 should be suitable for MIM, resistance projection welding to the header can 102, glass sealing of leads 114 for hermiticity, and plating. Examples of suitable materials include cold-rolled steel, Alloy 42, which is an alloy of nickel and iron, or copper tungsten (CuW) alloys. The header can 102 may also be made of Alloy 42 or other suitable material. One embodiment for constructing header can 102 is disclosed in U.S. Pat. No. 10/832,699, filed Apr. 27, 2004, and entitled "Packaging Assembly for Optical Subassembly," which application is incorporated by reference in its entirety. In some exemplary embodiments, the header can 102 is plated with electrolysis nickel.

Finally, the laser package 100 may also include bond wires (not shown) to provide electrical power from the leads 114 to the various powered devices such as, for example, the laser 110, a temperature sensor, or other devices.

III. An Exemplary Embodiment of a Method of Active Alignment

In order to produce an optoelectronic device whose components are properly aligned, such as, for example, the laser package 100, the header structure 101 is actively aligned with the header can 102 prior to attachment of the two parts to each other. In general, "active" alignment refers to processes whereby power is transmitted to the laser 110 and the resulting optical signal generated by the laser 110 is used to align the laser 110 with the lens 106.

The method of the present invention may be implemented by way of various systems and devices, and the scope of the invention should not be construed to be limited to any particular alignment setup, system or device. Prior to embodiment of the alignment method, the header structure 101 is securely positioned, such as by a clamp, mount, or other suitable device, in a predetermined position and orientation relative to header can 102. The header can 102 is similarly secured.

Exemplarily, a camera and zoom lens (not shown) are used in conjunction with the laser 110 and the lens 106 to actively align the laser and lens 106 relative to each other. More particularly, the zoom lens of the camera is configured and arranged to receive an optical signal passing through the lens 106. Power is provided to the laser 110 so that the laser 110 produces an optical signal which is directed towards header can 102 and through the lens 106. As the optical signal emitted by the laser 110 passes through the lens 106 and into the zoom lens of the camera, the camera receives an image of the alignment status of the laser 110 relative to the lens 106 (see FIG. 4, discussed below).

Passing the optical signal through the zoom lens on a camera (not shown) is one example of determining a position of the optical signal relative to a reference in order to determine whether the positioning of the optical signal is within a desired tolerance. Preferably, the zoom lens and camera are aligned before aligning laser 110 and lens 105. It will be appreciated that other structures may be used in order to determine the accurate positioning of the optical signal emitted from the laser.

In general, the position of the header structure 101 and, thus, the position of laser 110 carried in the header structure 101, is then adjusted relative to the header can 102 and, thus, to the position of lens 106 carried in the header can 102, until the relative alignment of the header can 102 and header structure 101 with respect to each other falls within a desired tolerance range, at which point the header structure 101 and header can 102 are joined together, for example by resistance projection welding or other suitable process. In an alternative embodiment, the position of header can 102 (and lens 106 carried in header can 102) is adjusted relative to the header structure 101 so as to cause the relative alignment of the header can 102 and header structure 101 with respect to each other to be within a desired tolerance range, at which point the header structure 101 and header can 102 are joined together, for example by resistance projection welding or other suitable process.

Figure 4:
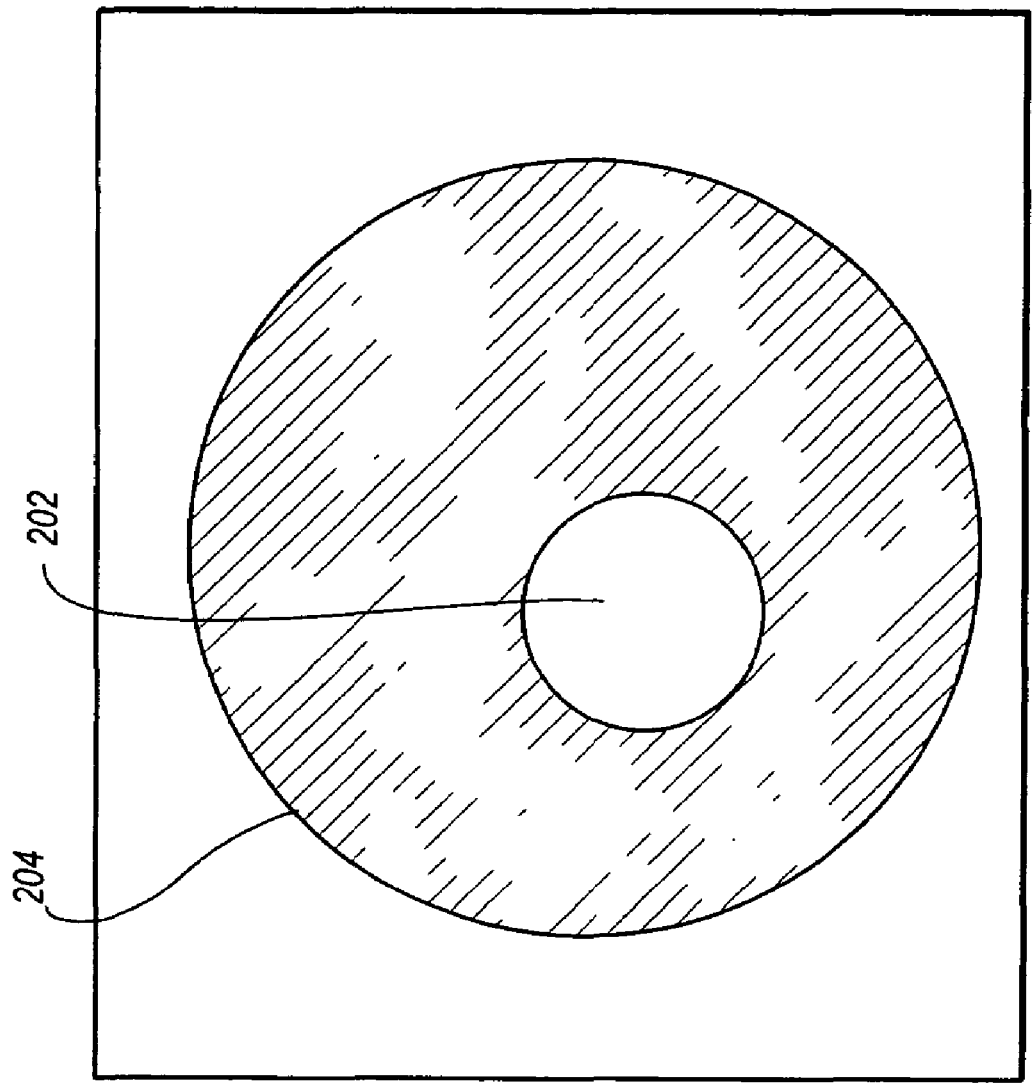
FIG. 4 is an exemplary image produced by a camera and zoom lens as the laser is aligned to the lens.

FIG. 4 illustrates an exemplary image 200 as received by the camera and zoom lens. The optical signal generated by the laser 110 and transmitted through the lens 106 exemplarily appears as a relatively bright spot 202. The larger target 204 is a marker which indicates the acceptable tolerance variation with regard to the relative alignment of the laser 110 with respect to the lens 106. To align the laser 110 to the lens 106, the user adjusts the relative alignment of the header structure 101 and header can 102 until the spot 202 is positioned within the larger target 204. In at least some embodiments, the spot 202 is positioned so as to be substantially concentric with the target 204. While spot 202 and target 204 are shown as substantially circular, it will be appreciated depending on the laser 110 and lens 106, among other things, that the spot 202 and/or circular 204 may not be circular. Of course, variables such as the permissible tolerance variation may vary depending upon the application. It will be appreciated that the size of target 204 which represents the permissible tolerance range may change depending on the design parameters of the particular optoelectronic device being assembled.

In some embodiments, the camera lens may actually enlarge the laser 110 signal. Enlarging the image enables fast vector alignment. Vector alignment (point to point alignment) is possible where the spot 202 can be moved directly to the inside of larger target 204. This can assist in providing a faster alignment process.

Once the laser 110 and the lens 106 have been suitably aligned in the "x" and "y" axes, the header structure 101 and header can 102 are moved towards each other (along an imaginary "z" axis oriented perpendicular to the plane of the page upon which FIG. 4 appears) so as to cause header structure 101 and header can 102 to mate upon adequate bonding pressure as illustrated in FIG. 2. The header structure 101 and header can 102 are then joined together, for example by resistance projection welding.

Among other advantages, the present invention enables production of an optoelectronic device, such as a laser package, having a high degree of alignment accuracy. Such high quality optoelectronic components can then be used in various optoelectronic devices to increase the quality, accuracy, and longevity, of the optoelectronic device.

What is claimed is:

1. A method for actively aligning an optoelectronic device, the optoelectronic device having a first portion containing a laser and a second portion containing an optical element, the method comprising:

securely positioning a first portion containing a laser and a second portion containing an optical element such that the laser can be optically coupled with the optical element and such that at least one of the first portion and the second portion can be moved in at least one dimension;

transmitting an optical signal from the laser through the optical element;

determining a position of the optical signal relative to a reference, the reference defining a desired tolerance; and adjusting the position of at least one of the first portion and the second portion until the optical signal is within the desired tolerance.

2. The method as recited in claim 1, wherein determining a position of the optical signal relative to a reference comprises:

enlarging the optical signal; and capturing an image of the enlarged optical signal compared with a marker to indicate the desired tolerance.

3. The method as recited in claim 2, wherein adjusting the position of at least one of the first portion and the second portion until the optical signal is within the desired tolerance further comprises moving at least one of the first portion and the second portion until the enlarged optical signal falls within the marker.

4. The method as recited in claim 1, wherein adjusting the position of at least one of the first portion and the second portion comprises moving at least one of the first portion and the second portion in the x-direction and y-direction.

5. The method as recited in claim 2, wherein a camera is used to enlarge the optical signal and to capture an image of the enlarged optical signal compared with a marker to indicate the desired tolerance.

6. The method as recited in claim 1, further comprising connecting the first portion and the second portion after adjusting the position of at least one of the first portion and the second portion.

7. The method as recited in claim 6, wherein connecting the first portion and the second portion comprises projection welding the first portion to the second portion.

8. The method as recited in claim 1, wherein the optical element comprises at least one of an optical fiber, a lens, an isolator, a collimator, a filter, and a circulator.

9. The method as recited in claim 1, wherein the first portion comprises a header structure containing the laser and the second portion comprises a header can containing the optical element.

10. The method as recited in claim 1, wherein the first portion comprises a laser package containing the laser and the second portion comprises a nose assembly containing an optical element.

* * * * *